United States Patent
Iwami

(10) Patent No.: US 9,596,371 B2
(45) Date of Patent: Mar. 14, 2017

(54) IMAGE FORMING APPARATUS HAVING AN IMPROVED RESIDUAL SHEET ESTIMATION WITH TONER DEVELOPMENT AND SHEET TRANSPORTATION MODES

(71) Applicant: KYOCERA Document Solutions Inc., Osaka (JP)

(72) Inventor: Naoki Iwami, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 15/049,938

(22) Filed: Feb. 22, 2016

(65) Prior Publication Data

US 2016/0255226 A1    Sep. 1, 2016

(30) Foreign Application Priority Data

Feb. 27, 2015   (JP) ................. 2015-037998

(51) Int. Cl.
| | |
|---|---|
| H04N 1/00 | (2006.01) |
| G06K 15/12 | (2006.01) |
| G06K 15/16 | (2006.01) |
| G06K 15/00 | (2006.01) |

(52) U.S. Cl.
CPC ......... *H04N 1/00644* (2013.01); *G06K 15/12* (2013.01); *G06K 15/16* (2013.01); *G06K 15/4065* (2013.01); *H04N 1/0057* (2013.01); *H04N 2201/0091* (2013.01); *H04N 2201/0093* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 8,025,284 B2 | 9/2011 | Ikeuchi | |
| 2005/0088681 A1* | 4/2005 | Hosoda | G06F 3/1204 358/1.14 |
| 2006/0020365 A1* | 1/2006 | Takeda | G03G 15/6591 700/226 |
| 2006/0182451 A1* | 8/2006 | Shoji | G03G 15/55 399/9 |
| 2007/0047979 A1* | 3/2007 | Ai | G03G 15/6508 399/23 |
| 2008/0165231 A1* | 7/2008 | Hiroki | B41J 2/17513 347/86 |

(Continued)

FOREIGN PATENT DOCUMENTS

JP    2010-132374    6/2010

*Primary Examiner* — Ming Hon

(57) ABSTRACT

In an image forming apparatus, a paper sheet cassette stores a bunch of paper sheets to be fed. A media sensor unit measures a thickness and a surface roughness of one paper sheet fed and transported from the paper sheet cassette. A residual sheet amount sensor detects a residual amount of the paper sheets in the paper sheet cassette. A residual sheet number estimating unit estimates the number of residual paper sheets in the paper sheet cassette on the basis of (a) a thickness of a bunch of the paper sheet in the paper sheet cassette, the thickness of the bunch corresponding to the residual amount detected by the residual sheet amount sensor and (b) the thickness of the one sheet and the surface roughness of the one sheet measured by the media sensor unit.

2 Claims, 4 Drawing Sheets

(56) References Cited

U.S. PATENT DOCUMENTS

| | | | | |
|---|---|---|---|---|
| 2010/0133745 A1* | 6/2010 | Ikeuchi | ............... | B65H 1/14 |
| | | | | 271/265.04 |
| 2012/0099913 A1* | 4/2012 | Joseph | ............... | B41J 11/0075 |
| | | | | 400/582 |
| 2012/0224202 A1* | 9/2012 | Ito | ............... | B41J 11/008 |
| | | | | 358/1.12 |
| 2014/0132972 A1* | 5/2014 | Watanabe | ............... | H04N 1/00228 |
| | | | | 358/1.13 |
| 2014/0376028 A1* | 12/2014 | Tsujita | ............... | G06K 15/4065 |
| | | | | 358/1.14 |

* cited by examiner

IMAGE FORMING APPARATUS HAVING AN IMPROVED RESIDUAL SHEET ESTIMATION WITH TONER DEVELOPMENT AND SHEET TRANSPORTATION MODES

CROSS-REFERENCE TO RELATED APPLICATIONS

This application relates to and claims priority rights from Japanese Patent Application No. 2015-037998, filed on Feb. 27, 2015, the entire disclosures of which are hereby incorporated by reference herein.

BACKGROUND

1. Field of the Present Disclosure

The present disclosure relates to an image forming apparatus.

2. Description of the Related Art

For a user to supply print paper sheets at appropriate timing, an image forming apparatus calculates the number of residual sheets on the basis of the thickness of a sheet and the thickness of a bunch of sheets in a sheet tray.

However, even if the thickness of a bunch of sheets is the same, the different surface roughness of the sheet results in the different number of sheets in the bunch. Specifically, a rougher surface of a sheet results in a large gap between sheets in the bunch, and therefore the number of sheets in the bunch gets smaller. Consequently, the aforementioned technique may not obtain the correct number of residual sheets.

SUMMARY

An image forming apparatus according to an aspect of the present disclosure includes a paper sheet cassette, a media sensor unit, a residual sheet amount sensor, and a residual sheet number estimating unit. The paper sheet cassette is configured to store a bunch of paper sheets to be fed. The media sensor unit is configured to measure a thickness and a surface roughness of one paper sheet fed and transported from the paper sheet cassette. The residual sheet amount sensor is configured to detect a residual amount of the paper sheets in the paper sheet cassette. The residual sheet number estimating unit is configured to estimate the number of residual paper sheets in the paper sheet cassette on the basis of (a) a thickness of a bunch of the paper sheet in the paper sheet cassette, the thickness of the bunch corresponding to the residual amount detected by the residual sheet amount sensor and (b) the thickness of the one sheet and the surface roughness of the one sheet measured by the media sensor unit.

These and other objects, features and advantages of the present disclosure will become more apparent upon reading of the following detailed description along with the accompanied drawings.

DETAILED DESCRIPTION

Hereinafter, an embodiment according to aspects of the present disclose will be explained with reference to drawings.

Figure 1:
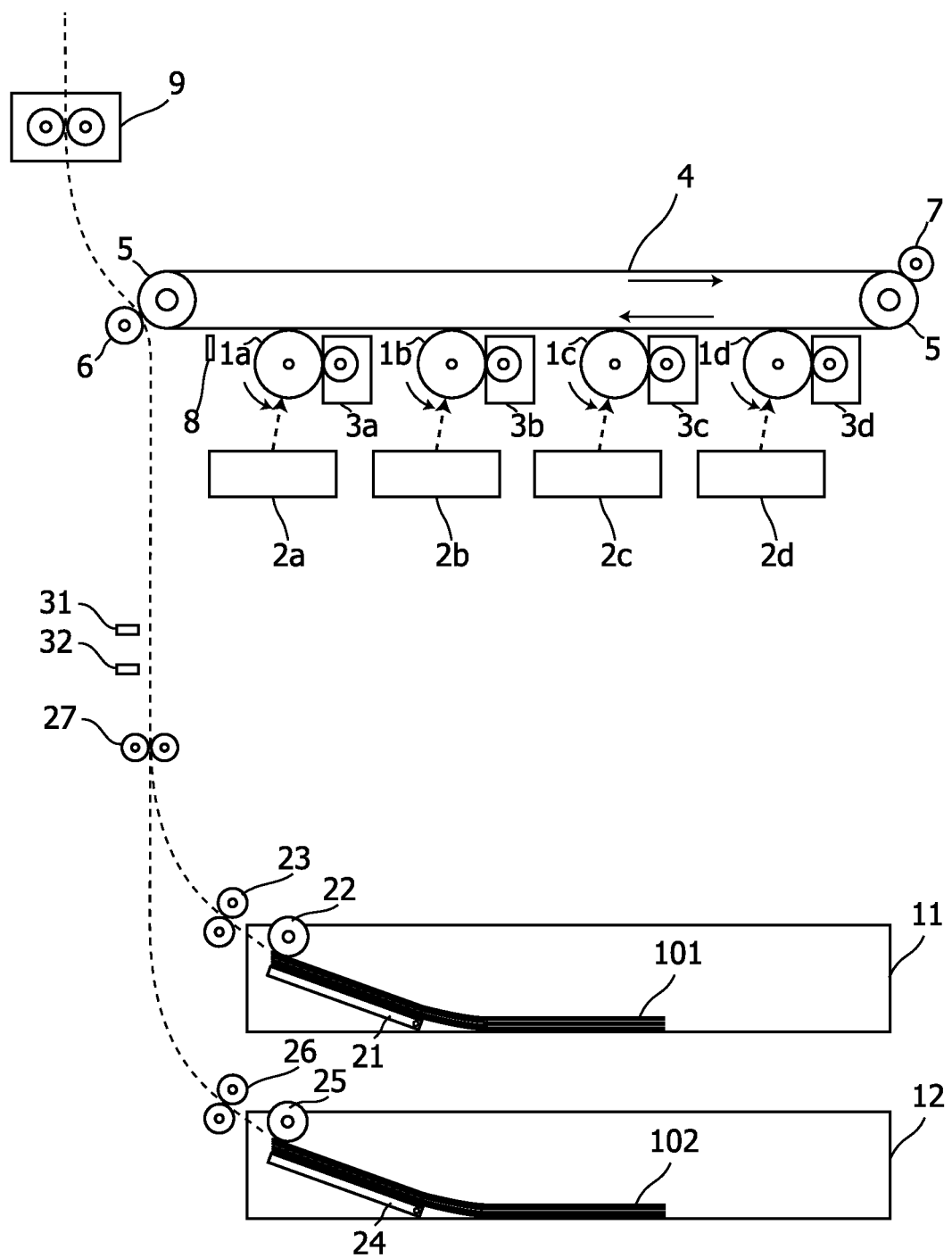
FIG. 1 shows a side view that indicates an internal mechanical configuration of an image forming apparatus in an embodiment according to the present disclosure.

FIG. 1 shows a side view that indicates an internal mechanical configuration of an image forming apparatus in an embodiment according to the present disclosure. The image forming apparatus shown in FIG. 1 is an apparatus having a printing function such as a printer, a facsimile machine, a copier, or a multi function peripheral.

The image forming apparatus in the present embodiment includes a tandem-type color development device. This color development device has photoconductor drums $1a$ to $1d$, exposure devices $2a$ to $2d$, and development units $3a$ to $3d$. The photo conductor drums $1a$ to $1d$ are four color photo conductors of Cyan, Magenta, Yellow and Black. For instance, the photoconductor drums $1a$ to $1d$ are made of amorphous silicon.

The exposure devices $2a$ to $2d$ are devices that form electrostatic latent images by irradiating laser light to the photo conductor drums $1a$ to $1d$, respectively. The laser light is scanned in the direction (the primary scanning direction) perpendicular to the rotation direction (the secondary scanning direction) of the photo conductor drum $1a$, $1b$, $1c$ or $1d$. The exposure devices $2a$ to $2d$ include laser scanning units that include laser diodes as light sources of the laser light, optical elements (such as lens, mirror and polygon mirror) that guide the laser light to the respective photo conductor drums $1a$ to $1d$.

Further, in the periphery of each one of the photo conductor drums $1a$ to $1d$, a charging unit such as scorotron, a cleaning device, a static electricity eliminator and so on are disposed. The cleaning device removes residual toner on each one of the photo conductor drums $1a$ to $1d$ after primary transfer. The static electricity eliminator eliminates static electricity of each one of the photo conductor drums $1a$ to $1d$ after primary transfer.

The development unit $3a$, $3b$, $3c$ or $3d$ includes a toner cartridge and a development device. The toner cartridge contains toner of one of four colors: Cyan, Magenta, Yellow, and Black. The toner is supplied from a toner hopper in the toner cartridge to the development device. The development device adheres the toner on the photoconductor drum $1a$, $1b$, $1c$, or $1d$. The development device $3a$, $3b$, $3c$, or $3d$ forms a toner image by adhering the toner to an electrostatic latent image on the photoconductor drum $1a$, $1b$, $1c$, or $1d$. An unshown toner conveyance unit is driven by a driving device such as a motor and conveys the toner from the toner hopper to the development device.

The photoconductor drum $1a$, the exposure device $2a$ and the development unit $3a$ perform development of Magenta. The photoconductor drum $1b$, the exposure device $2b$ and the development unit $3b$ perform development of Cyan. The photoconductor drum $1c$, the exposure device $2c$ and the development unit $3c$ perform development of Yellow. The photoconductor drum $1d$, the exposure device $2d$ and the development unit $3d$ perform development of Black.

The intermediate transfer belt 4 is a loop-shaped image carrier (here an intermediate transfer member), and contacts the photoconductor drums 1a to 1d. Toner images on the photoconductor drums 1a to 1d are primarily transferred onto the intermediate transfer belt 4. The intermediate transfer belt 4 is hitched around driving rollers 5, and rotates by driving force of the driving rollers 5 towards the direction from the contact position with the photoconductor drum 1d to the contact position with the photoconductor drum 1a.

A transfer roller 6 makes a conveyed paper sheet (as mentioned below) contact the transfer belt 4, and secondarily transfers the toner image on the transfer belt 4 to the paper sheet. The paper sheet on which the toner image has been transferred is conveyed to a fuser 9, and consequently, the toner image is fixed on the paper sheet.

A roller 7 includes a cleaning brush, and removes residual toner on the intermediate transfer belt 4 by the cleaning brush contacting to the intermediate transfer belt after transferring the toner image to the paper sheet and/or after toner density calibration or toner gradation calibration.

A sensor 8 irradiates light to the intermediate transfer belt 4, and detects its reflection light from a surface of the intermediate transfer belt 4 or a toner pattern on the intermediate transfer belt 4. For example, in toner gradation calibration, the sensor 8 irradiates a light beam to a predetermined area (an area onto which a toner patch for calibration is transferred) on the intermediate transfer belt 4, detects its reflection light, and outputs an electronic signal corresponding to the received light amount.

Further, the image forming apparatus of this embodiment includes plural paper sheet cassettes 11 and 12.

The paper sheet cassette 11 is enabled to be opened and closed; in the open status, a user or the like supplies one or plural paper sheets 101 (i.e. a bunch of paper sheets) of a specific size into the paper sheet cassette 11, and in the close status, the paper sheet cassette 11 pushes up the paper sheets 101 with a lift plate 21 so as to cause the paper sheets 101 to contact to a pickup roller 22. A driving mechanism of the lift plate 21 is configured, for example, to mechanically push up the lift plate 21 by using an action for moving the paper sheet cassette 11 to the close status. The paper sheets 101 on the paper sheet cassette 11 are fed by the pickup roller 22 one by one from the top of the bunch of the paper sheets 101. A transportation roller 23 is a roller that transports the paper sheets 101 one by one fed by the pickup roller 22 from the paper sheet cassette 11.

Similarly, the paper sheet cassette 12 is enabled to be opened and closed; in the open status, a user or the like supplies one or plural paper sheets 102 (i.e. a bunch of paper sheets) of a specific size into the paper sheet cassette 12, and in the close status, the paper sheet cassette 12 pushes up the paper sheets 102 with a lift plate so as to cause the paper sheets 102 to contact to a pickup roller 25. A driving mechanism of the lift plate 24 is configured, for example, to mechanically push up the lift plate 24 by using an action for moving the paper sheet cassette 12 to the close status. The paper sheets 102 on the paper sheet cassette 12 are fed by the pickup roller 25 one by one from the top of the bunch of the paper sheets 102. A transportation roller 26 is a roller that transports the paper sheets 102 one by one fed by the pickup roller 25 from the paper sheet cassette 12.

A transportation roller 27 is a transportation roller on a transportation path common to the paper sheets 101 and 102 transported from the paper sheet cassettes 11 and 12.

Specifically, if the paper sheet cassette 11 is selected to feed a paper sheet, then the transportation rollers 23 and 27 transports the paper sheet 101 to a registration roller (not shown) prior to the transfer roller 6.

If the paper sheet cassette 12 is selected to feed a paper sheet, then the transportation rollers 26 and 27 transports the paper sheet 102 to a registration roller (not shown) prior to the transfer roller 6.

Further, a sheet thickness sensor 31 and a sheet surface roughness sensor 32 are disposed as a media sensor unit on a transportation path common to the paper sheets 101 and 102 transported from the paper sheet cassettes 11 and 12. The sheet thickness sensor 31 measures a thickness of one paper sheet 101 or 102 in transportation. The sheet surface roughness sensor 32 measures a surface roughness of one paper sheet 101 or 102 in transportation. For example, as the sheet thickness sensor 31, a contact-type or non-contact-type sensor (e.g. of an optical type or an ultrasonic type) is used. Further, for example, the sheet surface roughness sensor 32 irradiates light to the paper sheet, detects its scattering reflection light, and measures the surface roughness on the basis of the detected intensity of the scattering reflection light.

Figure 2:
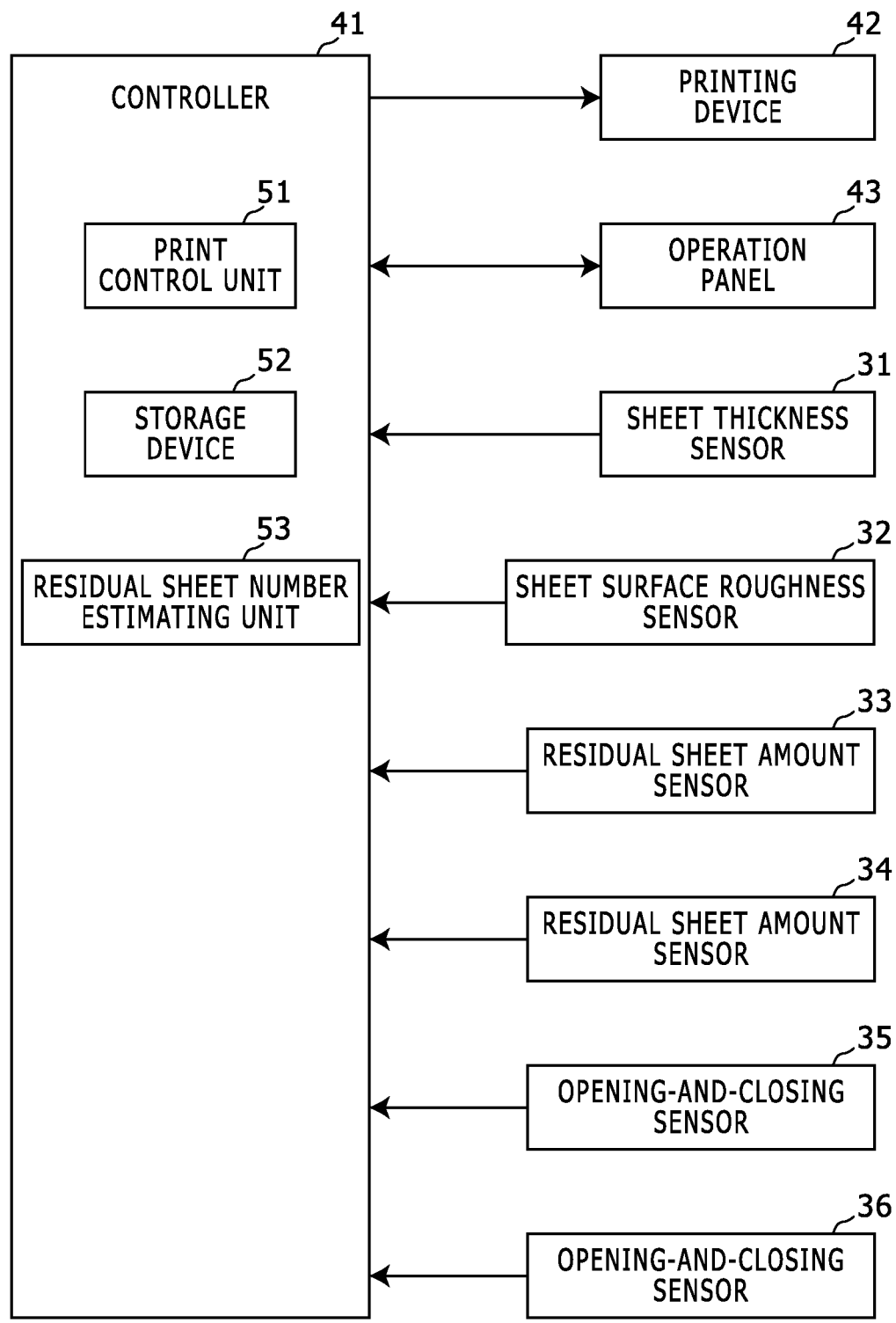
FIG. 2 shows a block diagram that indicates an electronic configuration of the image forming apparatus in the embodiment according to the present disclosure.

FIG. 2 shows a block diagram that indicates an electronic configuration of the image forming apparatus in the embodiment according to the present disclosure. As shown in FIG. 2, further, this image forming apparatus includes residual sheet amount sensors 33 and 34 corresponding to the paper sheet cassettes 11 and 12. The residual sheet amount sensors 33 and 34 detect residual amounts of the paper sheets 101 and 102 in the paper sheet cassettes 11 and 12, respectively. Furthermore, this image forming apparatus includes opening-and-closing sensors 35 and 36 respectively corresponding to the paper sheet cassettes 11 and 12. The opening-and-closing sensors 35 and 36 detect opening and closing the paper sheet cassettes 11 and 12, respectively.

In the present embodiment, the residual sheet amount sensors 34 or 35 detects one level corresponding to actual continuous residual amount of the paper sheets 101 or 102, among plural residual amount levels stepwise different from each other. Here the residual sheet amount sensor 34 or 35 detects a relative value (e.g. 10 percent, 30 percent, . . . ) as the residual amount of the paper sheets 101 or 102 where a predetermined thickness of a bunch of the paper sheets corresponds to 100 percent.

For example, the residual sheet amount sensor 34 or 35 detects the residual amount of the paper sheets on the basis of a position of a predetermined part (e.g. a tip) of the lift plate 21 or 24 in the height direction. More the thickness of the bunch of the paper sheets decreases, the lift plate 21 or 24 is lifted higher, and therefore the residual amount of the paper sheets is detected by detecting a position of the lift plate 21 or 24 (i.e. a lifting amount) with an optical sensor, a contact-type sensor or the like.

The residual sheet amount sensor 34 or 35 sets the residual amount of a bunch of the paper sheets corresponding to a predetermined position of the lift plate 21 or 24 as 100 percent, and detects a relative value (e.g. 0 percent, 30 percent, or 70 percent) as the residual amount of the paper sheets 101 or 102 corresponding to the current position of the lift plate 21 or 24.

For example, in a case that the detectable residual sheet amount levels are 0 percent, 30 percent, 70 percent and 100 percent, if the actual residual sheet amount is larger than 70 percent then it is determined that the residual sheet amount level is 100 percent, if the actual residual sheet amount is equal to or less than 70 percent and larger than 30 percent then it is determined that the residual sheet amount level is 70 percent, and if the actual residual sheet amount is equal to or less than 30 percent and larger than a sheet empty level then it is determined that the residual sheet amount level is 30 percent.

Further, this image forming apparatus includes a controller 41, a printing device 42, and an operation panel 43.

The controller 41 includes a computer, an ASIC (Application Specific Integrated Circuit) and/or the like and thereby embodies sorts of processing units with software and/or hardware, watches and controls an internal device such as the printing device 42, and performs sorts of data processing.

Furthermore, the printing device 42 is an internal device that performs printing of a document image using a mechanical configuration shown in FIG. 1.

The operation panel 43 includes a display device such as a liquid crystal display that displays an operation screen to a user, and an input device such as a touch panel or a hard key that receives a user operation.

Further, the controller 41 includes a print control unit 51, a storage device 52, and a residual sheet number estimating unit 53.

The print control unit 51 obtains output values of the aforementioned sensors 31 to 36, controls the toner development and the sheet transportation in the printing device 42 on the basis of the obtained output values, and thereby performs printing.

In this process, the print control unit 51 is a processing circuit that controls a driving source that drives the aforementioned rollers, a bias induction circuit that induces a development bias and a primary transfer bias, and the exposure devices 2a to 2d in order to perform forming an electrostatic latent image, developing a toner image, transferring and fixing the toner image, feeding a sheet of paper, printing on the sheet, and outputting the sheet. The development biases are applied between the photoconductor drums 1a to 1d and the development units 3a to 3d, respectively. The primary transfer biases are applied between the photoconductor drums 1a to 1d and the intermediate transfer belt 4, respectively.

Further, the print control unit 51 watches the residual amounts of the paper sheet cassettes 11 and 12 detected by the residual sheet amount sensors 33 and 34, and causes the sheet thickness sensor 31 and the sheet surface roughness sensor 32 to start the detection immediately when the residual amount detected by the residual sheet amount sensor 33 or 34 gets the lowest level other than the sheet empty level among the plural residual sheet amount levels, and causes the sheet thickness sensor 31 and the sheet surface roughness sensor 32 to end the detection immediately when finishing the detection of the thickness and the surface roughness. In this manner, the sensors 31 and 32 operate in a short time and consequently take a long lifetime.

The print control unit 51 (a) starts counting a used paper sheet of each paper sheet cassette 11 or 12 immediately when estimating the number of the residual paper sheets corresponding to the lowest level, (b) estimates the number of the current residual paper sheets on the basis of (b1) the estimated number of the residual paper sheets corresponding to the lowest level and (b2) the number of the counted used paper sheets, and (c) changes a mode of the toner development and the sheet transportation (hereinafter called "print operation mode") from an image-forming preceding mode to a sheet-transportation preceding mode immediately when the estimated number of the current residual paper sheets gets equal to or less than a predetermined threshold value.

In a period when the detected residual amount of the paper sheets is larger than the lowest level, printing is performed in the image-forming preceding mode. In a period when the detected residual amount of the paper sheets is the lowest level, printing is performed in the image-forming preceding mode until the estimated number of the residual paper sheets gets equal to or less than a predetermined threshold value, and printing is performed in the sheet-transportation preceding mode after the estimated number of the residual paper sheets gets equal to or less than a predetermined threshold value.

The image-forming preceding mode is a mode in which the toner development is started earlier than starting the sheet transportation in continuous sheet printing. The sheet-transportation preceding mode is a mode in which the sheet transportation is started earlier than starting the toner development in continuous sheet printing. In the image-forming preceding mode, the toner development is started earlier than starting the sheet transportation, and therefore a toner image can be transferred to a paper sheet immediately when the transported paper sheet reaches the registration roller, and consequently, this mode gives relatively short printing time. However, if paper sheet empty arises, the toner image on the intermediate transfer belt 4 is discarded, and consequently unnecessary toner consumption is relatively large. On the other hand, in the sheet-transportation preceding mode, the sheet transportation is started earlier than the toner development, and therefore waiting time arises from a time when the transported paper sheet reaches the registration roller and a toner image is transferred after finishing the toner development, and consequently, this mode gives relatively long printing time. However, even if paper sheet empty arises, the toner development is canceled before forming the toner image on the intermediate transfer belt 4, and consequently unnecessary toner consumption is relatively small.

Therefore, the threshold value should be set as a value shortly before the sheet empty on the basis of the correctly estimated number of the residual paper sheets in order to reduce both of the unnecessary toner and the printing time.

The storage device 52 is a non volatile storage device such as a flash memory, and for each paper sheet cassette 11 or 12, stores (a) the residual sheet amount value detected by the residual sheet amount sensor 33 or 34, (b) the sheet thickness and the sheet surface roughness measured by the sheet thickness sensor 31 and the sheet surface roughness sensor 32, (c) the number of the residual paper sheets estimated by the residual sheet number estimating unit 53, and the like. It should be noted that if the apparatus is rebooted, the control mentioned below is continued by suitably using the data stored in the storage device 52.

For each paper sheet cassette 11 or 12, the residual sheet number estimating unit 53 estimates the number of residual paper sheets in the paper sheet cassette 11 or 12 on the basis of (a) a thickness of a bunch of the paper sheet in the paper sheet cassette 11 or 12, the thickness of the bunch corresponding to the residual amount detected by the residual sheet amount sensor 33 or 34 and (b) the thickness of the one sheet and the surface roughness of the one sheet measured by the sheet thickness sensor 31 and the sheet surface roughness sensor 32.

In the present embodiment, further, immediately when the residual amount detected by the residual sheet amount sensor 33 or 34 gets a lowest level (30 percent in the aforementioned example) other than sheet empty level (0 percent in the aforementioned example) among the plural residual sheet amount levels, the residual sheet number estimating unit 53 estimates the number of the residual paper sheets corresponding to the lowest level on the basis of (a)

the thickness of the bunch of the paper sheets corresponding to the lowest level and (b) the thickness of the one sheet and the surface roughness of the one sheet measured by the sheet thickness sensor 31 and the sheet surface roughness sensor 32.

For example, the residual sheet number estimating unit 53 calculates the number of the residual paper sheets with the following formula.

"Number of the residual paper sheets"="Thickness of a bunch of the paper sheets corresponding to the lowest level"/("Thickness of one paper sheet"*"Correction coefficient based on Surface roughness")

Here, "Thickness of a bunch of the paper sheets corresponding to the lowest level" is a given constant number. In addition, a relationship between the measured surface roughness and the correction coefficient may be determined in advance by an experiment. When the surface roughness is large, the value of the correction coefficient is large and when the surface roughness is small, the value of the correction coefficient is small.

Figure 3:
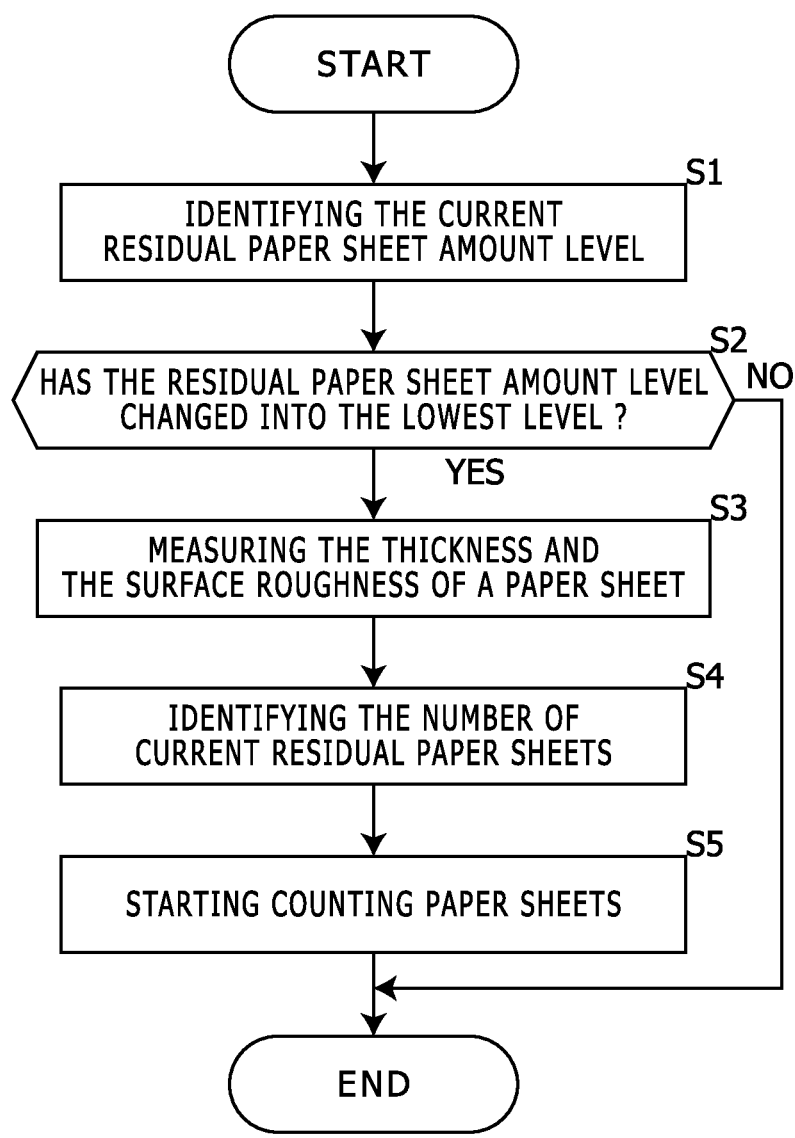
FIG. 3 shows a flowchart that explains a process performed every time when detecting a residual amount of sheets in the image forming apparatus shown in FIGS. 1 and 2.
Figure 4:
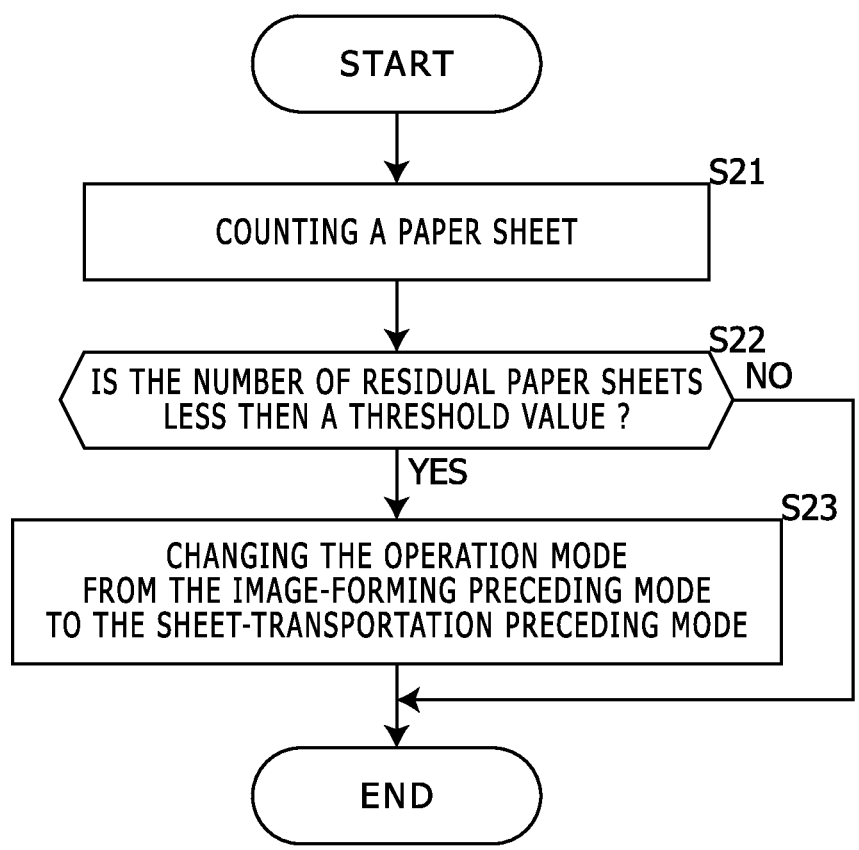
FIG. 4 shows a flowchart that explains a process performed every time when counting a sheet in the image forming apparatus shown in FIGS. 1 and 2.

The following part explains a behavior of the aforementioned image forming apparatus. FIG. 3 shows a flowchart that explains a process performed every time when detecting a residual amount of sheets in the image forming apparatus shown in FIGS. 1 and 2. FIG. 4 shows a flowchart that explains a process performed every time when counting a sheet in the image forming apparatus shown in FIGS. 1 and 2.

The print control unit 51 obtains the residual sheet amount levels of the paper sheet cassettes 11 and 12 using the residual sheet amount sensors 33 and 34 at predetermined timing or regularly (in Step S1).

For each paper sheet cassette 11 or 12, the print control unit 51 determines whether the obtained residual sheet amount level changed from a residual sheet amount level higher by one level than the lowest level to the lowest level (from 70 percent to 30 percent in the aforementioned example) or not (in Step S2).

For at least one of the paper sheet cassettes 11 and 12, if it is determined that the obtained residual sheet amount level changed from a residual sheet amount level higher by one level than the lowest level to the lowest level, then the print control unit 51 powers on the sheet thickness sensor 31 and the sheet surface roughness sensor 32 and thereby causes them to start the detection. Afterward, the print control unit 51 causes the sheet thickness sensor 31 and the sheet surface roughness sensor 32 to measure the thickness and the surface roughness of a paper sheet transported from the paper sheet cassette for which it was determined that the obtained residual sheet amount level changed from a residual sheet amount level higher by one level than the lowest level to the lowest level. The print control unit 51 obtains the measured thickness and the measured surface roughness and stores the measured thickness and the measured surface roughness in the storage device 52, and then powers off the sheet thickness sensor 31 and the sheet surface roughness sensor 32 and thereby causes the them to end the detection (in Step S3).

Subsequently, the residual sheet number estimating unit 53 estimates the number of the residual paper sheets in the paper sheet cassette of which the residual sheet amount level is the lowest level on the basis of the obtained sheet thickness and the obtained surface roughness in the aforementioned manner, and stores the estimated number of the residual paper sheets at the lowest level into the storage device 52 (in Step S4).

Further, immediately when for a paper sheet cassette 11 or 12 it was determined that the obtained residual sheet amount level changed from a residual sheet amount level higher by one level than the lowest level to the lowest level, the print control unit 51 starts counting the number of used paper sheets of this paper sheet cassette 11 or 12, and stores the current counted number into the storage device 52 (in Step S5).

It should be noted that if the residual sheet amount level obtained this time in Step S2 is not changed to the lowest level, then the aforementioned processes in Steps S3 to S5 are not performed.

Afterward, the print control unit 51 counts up a used paper sheet every time when a paper sheet of this paper sheet cassette is consumed in printing (in Step S21).

Every time when counting the used paper sheet of this paper sheet cassette, the print control unit 51 estimates the number of the current residual paper sheets by subtracting the counted number from the number of the residual paper sheets at the lowest level, and determines whether the number of the current residual paper sheets gets equal to or less than a predetermined threshold value or not (in Step S22).

The print control unit 51 sets the print operation mode as the image-forming preceding mode at the initial status, and if it was determined that the number of the current residual paper sheets got equal to or less than the predetermined threshold value, then the print control unit 51 changes the print operation mode from the image-forming preceding mode to the sheet-transportation preceding mode (in Step S23).

Contrarily, if it was determined that the number of the current residual paper sheets has got neither equal to nor less than the predetermined threshold value, then the print control unit 51 keeps the print operation mode as the image-forming preceding mode.

In the aforementioned embodiment, the sheet thickness sensor 31 and the sheet surface roughness sensor 32 measure a thickness and a surface roughness of one paper sheet fed and transported from the paper sheet cassette 11 or 12. The residual sheet amount sensors 33 and 34 detect the residual amount of the paper sheets in the paper sheet cassettes 11 and 12. The residual sheet number estimating unit 53 estimates the number of residual paper sheets in the paper sheet cassette 11 or 12 on the basis of (a) a thickness of a bunch of the paper sheet in the paper sheet cassette 11 or 12, the thickness of the bunch corresponding to the residual amount detected by the residual sheet amount sensor 33 or 34 and (b) the thickness of the one sheet and the surface roughness of the one sheet measured by the sheet thickness sensor 31 and the sheet surface roughness sensor 32.

Therefore, the number of the residual paper sheets in the paper sheet cassette 11 or 12 is correctly estimated. On the basis of this feature, the print operation mode is changed at adequate timing from the image-forming preceding mode to the sheet-transportation preceding mode, and consequently both of unnecessary toner consumption and printing time are reduced.

The description has been presented for purposes of illustration and description, and is not intended to be exhaustive or limited.

For example, in the aforementioned embodiment, when detecting opening and closing the paper cassette 11 or 12 with the opening-and-closing sensors 35 and 36, there is the possibility that a user added paper sheets or partly removes paper sheets in this paper cassette 11 or 12 and thereby the actual residual sheet amount has been changed. Therefore, it may be configured so that regarding the paper sheet cassette for which the opening and the closing were detected, if the residual sheet amount level after the opening and the closing is other than the aforementioned lowest level, then the control of the print operation mode is not changed and if the residual sheet amount level after the opening and the closing is the aforementioned lowest level, then the control of the print operation mode is changed.

For example, it may be configured so that regarding the paper sheet cassette for which the opening and the closing were detected, in a case that the residual sheet amount level after the opening and the closing is the aforementioned lowest level, (a) if the residual sheet amount level before the opening and the closing is the aforementioned lowest level then the print control unit 51 performs changing the print operation mode in the aforementioned manner, and (b) if the residual sheet amount level before the opening and the closing is other than the aforementioned lowest level then the print control unit 51 sets the print operation mode as the image-forming preceding mode or the sheet-transportation preceding mode selected on the basis of a setting. It should be noted that in this case, even if the residual sheet amount level before the opening and the closing is the aforementioned lowest level then the print control unit 51 may set the print operation mode as the image-forming preceding mode or the sheet-transportation preceding mode selected on the basis of a setting. For example, in this case, if a toner saving mode is set in a print setting, then the print operation mode may be set as the sheet-transportation preceding mode, and if a toner saving mode is not set in a print setting, then the print operation mode may be set as the image-forming preceding mode.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus, comprising:
    a paper sheet cassette configured to store a bunch of paper sheets to be fed;
    a media sensor unit configured to measure a thickness and a surface roughness of one paper sheet fed and transported from the paper sheet cassette;
    a residual sheet amount sensor configured to detect a residual amount of the paper sheets in the paper sheet cassette;
    a residual sheet number estimating unit configured to estimate the number of residual paper sheets in the paper sheet cassette on the basis of (a) a thickness of a bunch of the paper sheet in the paper sheet cassette, the thickness of the bunch corresponding to the residual amount detected by the residual sheet amount sensor and (b) the thickness of the one sheet and the surface roughness of the one sheet measured by the media sensor unit; wherein the residual sheet amount sensor detects one level as the residual amount of the sheets among plural residual amount levels stepwise different from each other; and immediately when the residual amount detected by the residual sheet amount sensor gets a lowest level other than sheet empty level among the plural residual sheet amount levels, the residual sheet number estimating unit estimates the number of the residual paper sheets corresponding to the lowest level on the basis of (a) the thickness of the bunch of the paper sheets corresponding to the lowest level and (b) the thickness of the one sheet and the surface roughness of the one sheet measured by the media sensor unit; and
    a print control unit configured to control toner development and sheet transportation; wherein the print control unit (a) starts counting a used paper sheet immediately when estimating the number of the residual paper sheets corresponding to the lowest level, (b) estimates the number of the current residual paper sheets on the basis of (b1) the estimated number of the residual paper sheets corresponding to the lowest level and (b2) the number of the counted used paper sheets, and (c) changes a mode of the toner development and the sheet transportation from an image-forming preceding mode to an sheet-transportation preceding mode immediately when the estimated number of current residual paper sheets gets equal to or less than a predetermined threshold value; wherein the image-forming preceding mode is a mode in which the toner development is started earlier than starting the sheet transportation; the sheet-transportation preceding mode is a mode in which the sheet transportation is started earlier than starting the toner development.

2. The image forming apparatus according to claim 1, wherein the media sensor unit starts the detection immediately when the residual amount detected by the residual sheet amount sensor gets the lowest level, and ends the detection immediately when finishing the detection of the thickness and the surface roughness.

* * * * *